Dec. 27, 1955     H. BUERGER     2,728,610
ORNAMENTAL AND PROTECTIVE VEHICLE WHEEL ASSEMBLY
Filed Oct. 8, 1953
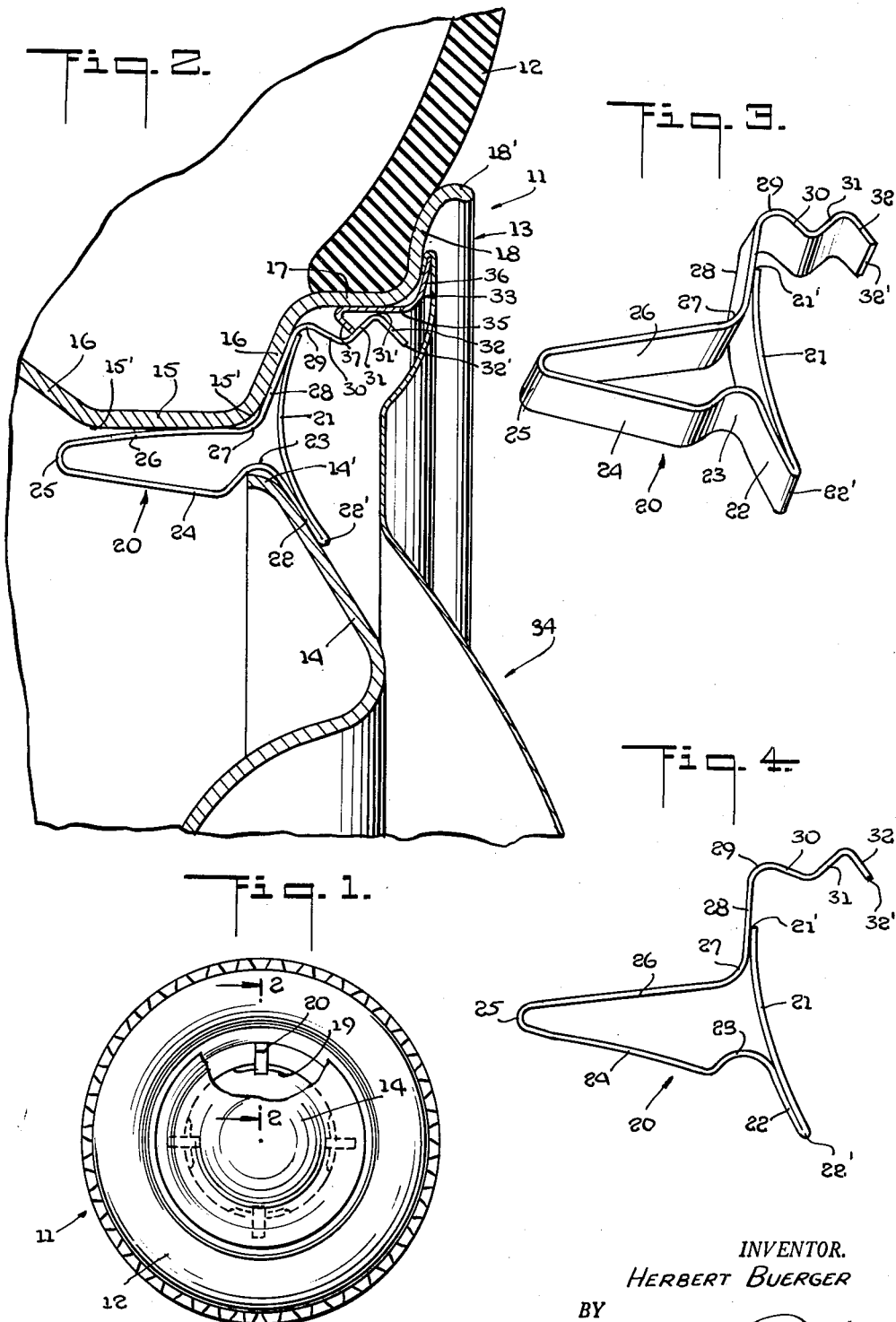
INVENTOR.
HERBERT BUERGER
BY
*J. B. Felolin*
ATTORNEY

United States Patent Office 2,728,610
Patented Dec. 27, 1955

2,728,610

ORNAMENTAL AND PROTECTIVE VEHICLE WHEEL ASSEMBLY

Herbert Buerger, Walton, N. Y.

Application October 8, 1953, Serial No. 384,863

6 Claims. (Cl. 301—37)

This invention relates to an ornamental and protective vehicle wheel assembly having a novel attaching means for securing it to the wheel.

A primary object of the present invention is to provide an ornamental and protective assembly comprising an annular mounting ring, a protective and decorative cover plate secured thereto, and a plurality of resilient retainer elements each economically formed of a single integral strip of metal, bent to a novel configuration whereby the retainer elements may be quickly and easily inserted within openings formed in the body portion of the wheel so as to engage the mounting ring and retain the latter secured in fixed position on the wheel, notwithstanding the severe shock and vibration to which the vehicle wheel is normally subjected.

Another object is to provide an assembly of the character described, wherein the above noted resilient retainer elements are each formed with a bent loop portion which is yieldably compressible so as to enable it to be inserted within an opening formed in the body portion of a vehicle wheel, the loop portion having recessed areas forming grooves adapted to receive the edges of the opening and to grip the latter securely when the compressive force on the loop portion is removed so as to allow the latter to expand outwardly.

A further object of the present invention is to provide in an assembly of the character described, a novel mode of engagement of each resilient retainer element with the mounting ring, the latter being provided with an integral projecting flange and the retainer element having a resilient finger engaging the end of the flange, the resilient finger and the flange being inclined at particular angles whereby the resilient force of the finger urges the flange in a direction to hold the mounting ring more securely to the vehicle wheel.

Another important object of the invention is to provide a novel inclined cam surface on the end of the resilient finger whereby as the assembly is moved axially inward while it is being placed in position on the wheel, the flange on the mounting ring will engage the cam surface so as to bend the resilient finger in a direction to allow the flange to assume the proper engaged relation to the finger.

Still another object of the present invention is to provide a novel configuration for the retainer element whereby one end of the metal strip of which it is formed engages an arcuate portion at the base of the resilient finger and acts as a support or fulcrum about which the finger bends as a beam, this supporting effect of the strip end serving to increase the stiffness and gripping efficiency of the resilient finger while enabling the strip to be made of inexpensive thin gauge stock.

Other objects and advantages of the present invention will appear as the description proceeds or are inherent in the structure described in this specification and illustrated in the accompanying drawing.

In the accompanying drawing:

Fig. 1 is a side elevational view of a vehicle wheel with a preferred form of the ornamental and protective assembly of the present invention mounted thereon, part of the cover plate of the assembly being broken away for greater clarity;

Fig. 2 is a sectional view taken on the line 2—2 of Fig. 1;

Fig. 3 is a perspective view of a single resilient retainer element; and

Fig. 4 is a side elevational view of the retainer element.

Referring to the drawing in more detail, the reference numeral 11 indicates generally a vehicle wheel with a tire 12 mounted thereon. The wheel 11 is of conventional construction and comprises an annular rim 13 and a central body portion 14 secured thereto. The rim 13 shown in the drawing is of the usual drop center type having a base web 15, a pair of opposite inclined side walls 16 extending from the web 15, outwardly projecting flanges 17 extending from the side walls 16, and a vertical rim edge 18 extending upwardly from each of the flanges 17 and having an outwardly furled flange 18'.

The body portion 14 is circular and is secured throughout its periphery to the inner surface of the base web 15 except that at four equidistant spaced areas the outer edge of the body portion 14 is recessed and spaced radially inwardly of the base web 15 as at 19, so as to form therewith a plurality of slots or openings circumferentially spaced around the wheel 11. Each of these slots 19 are adapted to receive a retainer element 20 in the manner to be described below.

In describing the ornamental and protective assembly embodying the present invention, the upward and downward directions as the structure is oriented in Fig. 2 will be referred to by the term "radially outward" and "radially inward" for purposes of conciseness and clarity, whereas the terms "axially outward" and "axially inward" are hereby defined to mean directions toward the right and the left, respectively, as viewed in Fig. 2. This terminology will also be employed in the claims and the same definitions will apply thereto.

The axis referred to as a reference line is of course the common axis of the wheel, axle (not shown) and the other annular elements to be described below.

As best seen in Figs. 3 and 4, each retainer element 20 is formed of a continuous integral strip of metal having an arcuate first portion 21 extending radially inwardly from one end 21' of the strip and having its concave side facing axially outwardly, the radially innermost end of the first portion 21 being bent or folded at 22' and the strip having a second portion 22 extending therefrom in a direction simultaneously axially inwardly and radially outwardly. The third portion 23 of the strip is of an arcuate shape having its concave side facing radially inwardly and connects said second portion 22 with a fourth portion 24 which extends axially inwardly toward an arcuate fifth portion 25 at the axially innermost end of the retainer element 20. The latter also comprises a sixth portion 26 spaced radially outwardly of the fourth portion 24 and extends in an axially outward direction and leads to an arcuate seventh portion 27 having its concave side facing approximately radially outwardly.

An eighth portion 28 extends radially outwardly from the arcuate seventh portion 27 toward an arcuate ninth portion 29 having its concave side facing approximately radially inwardly. A tenth portion 30 extends from the arcuate portion 29 in a direction simultaneously axially outwardly and radially inwardly and leads to an eleventh portion 31 extending simultaneously both axially and radially outwardly. A twelfth portion 32 projects at approximately the same angle as the tenth portion 30 but at a greater inclination as best understood from the drawing, and extends to the opposite end 32' of the integral metal strip forming the retainer element 20.

It will be observed that the portions 24, 25, 26 comprise a loop portion having a particular configuration in that the arcuate portion 25 forms a relatively narrow apex and the portions 24, 26 flare or taper outwardly therefrom whereby the loop portion is somewhat in the form of a wedge. Because of this wedge-like shape the loop portion of retainer element 20 may be quickly and easily inserted or snapped into place within one of the slots 19. More specifically, as the retainer element is being inserted, the axially innermost regions of the portions 24, 26 will first contact the edges 14', 15' of the slot 19. As the retainer element 20 continues to be pushed in the axially inward direction the tapered flaring portions 24, 26 thereof will continue to engage the edges 14', 15' of slot 19, so as to be urged together by this cam-like action toward the compressed position shown in Fig. 2 as distinguished from the unstressed normal state of the retainer element 20, shown in Figs. 3 and 4.

The arcuate portions 23, 27 at the ends of the loop portion 24, 25, 26 act as recesses or grooves receiving the edges 14', 15' of the slot 19 so as to retain the retainer element 20 securely in place within its respective slot 19, particularly in view of the resiliency of the retainer element 20 and its tendency to spring back toward its normal uncompressed state shown in Figs. 3 and 4.

As shown in these latter figures of the drawing, when the retainer element 20 is in its uncompressed state the end 21' of the metal strip abuts against the portion 28 at an intermediate point on the latter. However, when the retainer element 20 is compressed the end 21' will slide radially outwardly along the portion 28 until in the final compressed state shown in Fig. 2 the end 21' will contact the concave side of the arcuate portion 29 for a purpose to be described.

The arcuate portion 29 together with the portions 30, 31, 32 form a functional unit which may be termed a resilient finger. The latter is transversely bendable at its innermost end at arcuate portion 29 because of the fact that this end has the greatest bending moment when a transverse load is placed on the finger. Since the end or edge 21' of the metal strip forming retainer element 20 abuts against the concave surface of the arcuate portion 29, this end 21' acts as a support or fulcrum about which the resilient finger 29, 30, 31, 32 bends as a beam. The supporting effect of the end 21' of the metal strip serves to increase the stiffness of the finger 29, 30, 31, 32 while enabling the retainer element 20 to be formed of inexpensive thin gauge stock.

In addition to the retainer elements 20 described above, the ornamental and protective assembly of the present invention also comprises an annular mounting ring indicated generally at 33, and an ornamental and protective cover plate 34. The mounting ring 33 is formed with an axially extending web portion 35 having at its outer edge an integral flange 36 projecting radially outwardly. The opposite inner edge of the web portion 35 has integral therewith another flange 37 extending in a direction simultaneously axially outwardly and radially inwardly, this direction of the flange 37 being approximately perpendicular to the direction of the portion 31 of the retainer element 20.

The cover plate 34 has extending around its peripheral edge a flange 38 bent radially inwardly about the flange 36 on mounting ring 33 so as to secure the cover plate 34 thereto.

The operation of the several elements of the assembly as the latter is being placed in position on the vehicle wheel 11 will now be briefly described.

A retainer element 20 is inserted in each of the slots 19 in the manner described above, the outwardly flaring portions 24, 26 of the loop portion engaging the edges 14', 15' of each slot 19 so as to compress the retainer element and allow the recesses formed by the arcuate portions 23, 27 to snap around and securely engage said slot edges 14', 15' when the retainer elements 20 are fully inserted.

The mounting ring 33 and the cover plate 34 secured thereto are then positioned coaxially with respect to the vehicle wheel 11 and pushed axially inwardly.

During this axially inward movement of mounting ring 33, its flange 37 will first engage the inclined outer surface of portion 32 of the resilient finger 29, 30, 31, 32 thereby exerting a cam-like effect on the portion 32 so as to bend the resilient finger downwardly and thereby allow the axially inwardly moving flange 37 to ride over the high point 31' of the finger and come to rest in engagement with the inclined portion 31 thereof at the final secured position of the mounting ring 33 shown in Fig. 2.

It will be seen that the outer cylindrical surface of the web portion 35 of mounting ring 33 lies substantially flat against the inner surface of the wheel flange 17. The relative angles of inclination of the mounting ring flange 37 and the finger portion 31 are such that a tendency of the mounting ring 33 to move axially outwardly causes the resilient finger to press upwardly against the mounting ring flange 37 so as to urge the mounting ring web portion 35 into tighter engagement with the inner surface of the wheel flange 17. There is thus provided a unique and highly effective structure for retaining the mounting ring 33 and cover plate 34 in secured assembled position on the vehicle wheel 11. When it is desired to remove the assembly from the wheel 11, sufficient outward force on the mounting ring 33 applied by a conventional prying tool will result in the flange 37 exerting a camming effect on the finger portion 31 so as to bend the finger inwardly and allow the flange 37 to ride back over the high point 31', thereby enabling the assembly to be quickly and easily removed from the vehicle wheel 11.

It is to be understood that the specific embodiment of the invention described in this specification and illustrated in the drawing is merely illustrative of one of the many forms which the invention may take without departing from the scope thereof, the latter being delineated in the appended claims.

I claim:

1. An ornamental and protective assembly for a vehicle wheel, said assembly comprising an annular mounting ring, a cover plate secured to said mounting ring, and a plurality of retainer elements adapted to be inserted within openings formed in the body portion of the wheel and to retain the mounting ring in assembled position thereon, each of said retainer elements being in the form of an integral resilient strip of metal having means at one end thereof for resiliently engaging the mounting ring, a yieldable arcuate portion connected to said one end, a compressible loop portion adapted to be compressed and inserted into an opening formed in a wheel body and having recessed areas to receive the opposite edges of said opening, one end of said loop portion being connected to said arcuate portion, and the other end of said loop portion being connected to the opposite end of said strip of metal, said opposite end contacting said yieldable arcuate portion when said loop portion is compressed whereby said arcuate portion may bend about said opposite end as a fulcrum.

2. An ornamental and protective assembly for a vehicle wheel, said assembly comprising an annular mounting ring, a cover plate secured to said mounting ring, and a plurality of retainer elements adapted to be inserted within openings formed in the body portion of the wheel and to retain the mounting ring in assembled position thereon, each of said retainer elements being in the form of an integral resilient strip of metal having means at one end thereof for resiliently engaging the mounting ring, a yieldable arcuate portion connected to said one end, a compressible loop portion adapted to be compressed and inserted into an opening formed in a wheel body and having recessed areas to receive the opposite edges of said opening, one end of said loop portion being connected to said arcuate portion, and the other end of said loop portion being connected to the opposite end of said strip of metal, said opposite end contacting said yieldable arcuate portion when said loop portion is compressed whereby said arcuate portion may bend about said opposite end as a fulcrum, said mounting ring having a web portion and a flange portion integral therewith, said flange portion contacting said engaging means of each of said retainer elements.

3. An ornamental and protective assembly for a vehicle wheel, said assembly comprising an annular mounting ring, a cover plate secured to said mounting ring, and a plurality of retainer elements adapted to be inserted within openings formed in the body portion of the wheel and to retain the mounting ring in assembled position thereon, each of said retainer elements being in the form of an integral resilient strip of metal having means at one end thereof for resiliently engaging the mounting ring, a yieldable arcuate portion connected to said one end, a compressible loop portion adapted to be compressed and inserted into an opening formed in a wheel body and having recessed areas to receive the opposite edges of said opening, one end of said loop portion being connected to said arcuate portion, and the other end of said loop portion being connected to the opposite end of said strip of metal, said opposite end contacting said yieldable arcuate portion when said loop portion is compressed whereby said arcuate portion may bend about said opposite end as a fulcrum, said resilient engaging means comprising a resilient finger having at one end a cam surface extending in a direction simultaneously axially outwardly and radially inwardly, said loop portion being substantially wedge-shaped so as to be compressed by the engagement therewith of said opposite edge of the opening as the loop portion is being inserted thereinto, said mounting ring having a web portion and a flange portion extending therefrom, said flange portion engaging said resilient finger of each of said retainer elements.

4. An ornamental and protective assembly for a vehicle wheel comprising an annular drop center tire rim having a base web, a pair of oppositely inclined side walls extending from the base web, outwardly projecting flanges extending from the side walls, and rim edge portions extending upwardly from said flanges, and a circular body portion secured at its periphery to the inside of the base web of the wheel and having equiangularly spaced openings at its periphery and adjacent to said base web, said assembly comprising an annular mounting ring, having a substantially cylindrical portion contacting the inner surface of the outer one of said flanges of said tire rim, and a flange extending outwardly from the outer end of said cylindrical flange, and a bent back lip extending from the inner end of said cylindrical flange and projecting radially inwardly of the axis of the wheel and axially outwardly thereof, a wheel cover attached to the outer edge of said outwardly extending flange of said ring, said assembly further comprising a plurality of spring retainer elements for retaining the mounting ring and the wheel cover attached to the wheel, each of said retainer elements being made of a single strip of spring metal and comprising a loop portion projecting rearwardly through one of said openings in the wheel body and contacting the inner surface of the web base, said element having a constricted neck portion at said opening, a portion extending from one side of the loop and contacting the outer of said inclined side wall, a portion extending from the last portion and engaging the cylindrical flange of the mounting ring, and an edge of the bent back lip, each element further comprising a portion extending from the opposite side of the loop and contacting an outer surface of the wheel body.

5. The combination of claim 4, a portion extending from the last portion and transversing the neck of the loop and contacting the portion of the element which contacts said outer inclined side wall.

6. The combination of claim 5, each element having a notched portion engaging an edge of the wheel at said opening to aid in retaining said element in place.

References Cited in the file of this patent

UNITED STATES PATENTS

| | | |
|---|---|---|
| 1,739,057 | Bock | Dec. 10, 1929 |
| 1,997,756 | Stamy | Apr. 16, 1935 |
| 2,164,014 | Jones | June 27, 1939 |
| 2,567,142 | Barker | Sept. 4, 1951 |
| 2,605,530 | Slemmons | Aug. 5, 1952 |